July 11, 1961
T. D. DRITZ
2,992,017
PIPE COUPLING HAVING REMOTELY CONTROLLED
HEATING AND COOLING MEANS
Filed Sept. 5, 1956
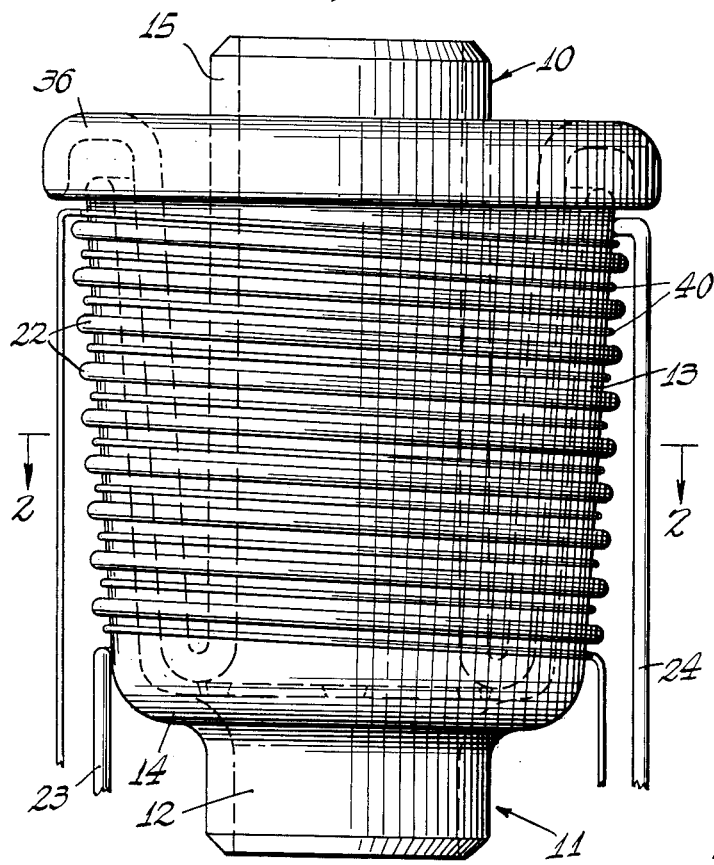
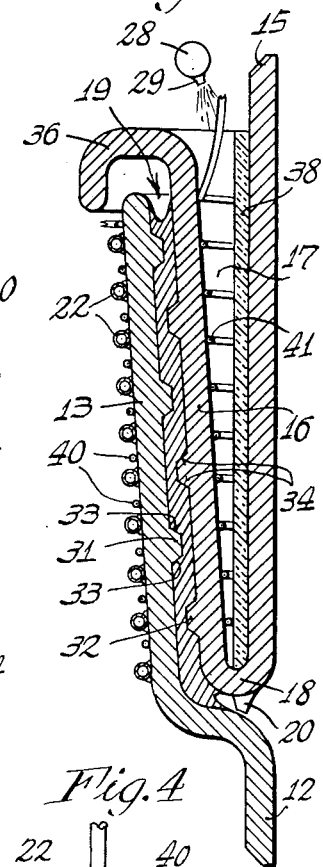
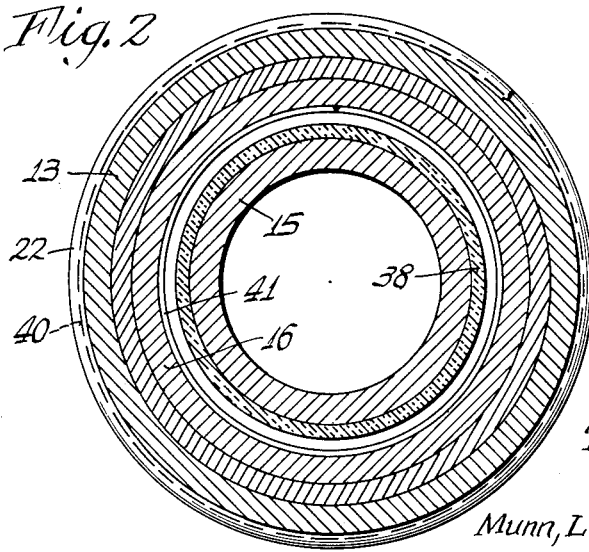
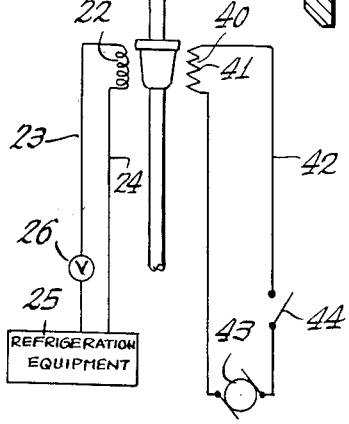
INVENTOR.
Theodore D. Dritz
BY
Munn, Liddy, Nathanson & March
ATTORNEYS

United States Patent Office 2,992,017
Patented July 11, 1961

2,992,017
PIPE COUPLING HAVING REMOTELY CONTROLLED HEATING AND COOLING MEANS
Theodore D. Dritz, Wantagh, N.Y.
(748 Santa Rita Way, Sacramento 25, Calif.)
Filed Sept. 5, 1956, Ser. No. 608,029
13 Claims. (Cl. 285—22)

This invention relates to coupling devices, and more particularly to couplings for connecting together the ends of pipes, conduits and similar fluid and liquid lines.

In the handling of certain flowable substances such as liquid materials and the like, it is at times necessary to couple and uncouple, by means controlled at a remote point, pipes through which the substance flows. This is particularly desirable if the flowable substance is radioactive, or where conditions surrounding the coupling device, as for example the presence of radioactivity, make it undesirable for personnel to enter the area and effect such coupling or uncoupling.

The present invention advantageously solves the problem above stated, of coupling and uncoupling hose or pipe sections by means controlled at a remote point, and one object of the invention is to provide a novel and improved, remotely-operated and readily-separable coupling device, particularly such a device intended for use in connection with flowable substances of the type which may be frozen solid.

Another object of the invention is to provide a novel and improved, remotely-operated coupling means as characterized, which is relatively quick and effective in its action, both for coupling and uncoupling pipe or hose sections.

A still further object of the invention is to provide an improved coupling device of the type characterized, which is reliable in providing a positive and effective, leak proof, readily controllable seal.

Yet another object of the invention is to provide an improved remote-controlled coupling device which is not susceptible to sticking or jamming, when the mating parts are to be brought together or separated.

A feature of the invention resides in the provision of an improved coupling means having all of the above advantages, which nevertheless is relatively simple in construction, easy to install and economical to fabricate.

Other features and advantages will hereinafter appear.

In the drawing accompanying this application, similar characters of reference indicate corresponding parts wherever possible in the several views, in which:

FIGURE 1 is a side elevation view of an improved coupling device made in accordance with the invention.

FIGURE 2 is a transverse sectional view taken on line 2—2 of FIGURE 1.

FIGURE 3 is a fragmentary longitudinal sectional view, taken through one side of the coupling.

FIGURE 4 is a schematic diagram illustrating the installation of the coupling device, and illustrating the remote control equipment by which remote operation of the coupling is effected.

As shown, the improved coupling of this invention comprises a pair of cooperable mating parts 10 and 11 arranged to be disposed in close proximity to each other, said parts having closely-spaced, expansive sealing surfaces.

In the embodiment of the invention illustrated and described herein the parts 10 and 11 are shown as being of different diameters, and as telescoping one within the other. However, it should be understood that the invention is not limited to the specific telescoping construction illustrated, since other constructions may be utilized without departing from the spirit of the invention.

At present, I prefer to construct the part 11 in tubular form, with a portion 12 constituting a section of pipe or hose line which may be secured to a suitable permanent union or coupling (not shown) or in any other manner to equipment from or to which a freezable liquid is to flow.

The coupling part 11 has a portion 13 of enlarged diameter, said portion being provided with a slight taper as shown, and being joined to the portion 12 by an annular shoulder 14.

The cooperable mating part 10 has a pipe line portion 15 which may be secured in any manner to another piece of equipment, that for example, one which might be portable or movable.

Secured to the portion 15 is a collar portion 16 of larger diameter, the portions 15 and 16 being spaced from each other to provide an annular recess 17, and being joined together by an annular connecting portion 18. Preferably, as shown, the collar portion 13 of the mating part 11, and the diameters of the portions 13 and 16 are sufficiently different to enable said portions to be telescoped one within the other, with an intervening annular, conical space 19. Thus, it is impossible for the large, opposed surfaces of the portions 13 and 16 to tightly seal one against the other due to their different diameters. Moreover, I provide additional spacing means to prevent sealing of the mating parts at the shoulder 14 and the connector portion 18. Referring to FIGURE 3, the connector portion 18 may have spacing projections 20 equally angularly spaced, to maintain separation of the connector portion 18 from the shoulder 14.

It will be readily understood that, in accordance with the above construction, the mating parts 10 and 11 may be easily and quickly brought together and telescoped, or separated from each other.

By the present invention I provide a means for applying a cooling medium and also a heating medium to the coupling parts, thereby to effect a freezing and also a thawing of the freezable substance (carried by the coupling parts) when such substance flows or is disposed in the annular space 19. In accomplishing this, I locate a substantially helical cooling coil 22 on the portion 13 of the part 11, through which a cooling medium may be forced. The convolutions of the coil 22 may be cemented, brazed or otherwise secured to the wall portion 13, and the ends 23 and 24 of the coil may be brought to a remote point and connected to refrigeration equipment 25, through a suitable valve 26 as illustrated in FIGURE 4. By this organization I am enabled to thoroughly chill the wall portion 13 of the part 11.

For the purpose of chilling the wall 16 of the part 10 I provide a conduit 28 of circular or annular configuration having a plurality of nozzles 29 directed toward the annular space or recess 17. Liquid carbon dioxide or nitrogen at low temperatures may be sprayed from the conduit 28 through the nozzles 29, as to strike the wall or collar portion 16 and thoroughly chill the same. Accordingly, with both the walls 13 and 16 chilled and held at a low, sub-freezing temperature the substance flowing through the coupling and tending to flow between the mating parts, particularly the walls 13 and 16, will be quickly frozen and solidified, thereby constituting a perfect, tight seal. Such frozen substance is indicated in FIGURE 3, being shown by cross hatching indicating metal, since it is contemplated that the coupling device of this invention may be used in conjunction with liquid metals, having either radioactivity or no radioactivity. It will be understood that, even though the liquid metal which flows through the coupling has no radioactivity, the coupling itself may be disposed in a place considered undesirable for living persons, as for example where there is contamination by radioactivity.

It will be noted that any expansion of the liquid substance during the freezing process will tend to further increase the effectiveness of the above seal.

Further, in accordance with the invention, to guarantee a tight seal, the walls 13 and 16 may be provided with individual projections 31 and 32, such projections being preferably staggered as shown. The projections 31 and 32 may be in the form of nibs or bumps, or they may be in the form of annular ribs, and preferably have sloping side walls 33 and 34 to prevent interlocking during assembly or disassembly of the coupling parts 10 and to generally facilitate such relative movement.

Where the freezable liquid substance which is to be handled is radioactive, a shield 36 of annular shape with substantially an L section may be provided on the wall 16, to inclose the free end of the wall 13.

In the event that the application of the cooling medium to the part 10 might result undesirably in appreciably cooling the freezable substance passing through the coupling, thermal insulation 38 may be provided in the annular recess 17, as shown in FIGURE 3, to minimize the cooling effect of the sprayed carbon dioxide or nitrogen.

Moreover, in accordance with this invention, I provide means controllable from a remote point, by which the walls 13 and 16 may be quickly heated to thaw and melt the frozen substance in the space 19, thereby to break the seal and permit separation of the coupling parts. Such means is illustrated as comprising electric heating coils 40 and 41 disposed against and carried by the walls 13 and 16. As shown in FIGURE 4, the heating coils 40 and 41 may be connected with leads 42 led to a remote point and fed by a generator 43. The flow of current through the leads 42 may be controlled in any suitable manner, as by an electric switch 44.

It will be readily understood from the above description that the assembly of the coupling parts involves merely bringing together in telescoping relation the walls 13 and 16. The sealing of the coupling is effected by applying a cooling medium to the said walls as above explained, and such sealing awaits the initial flow of substance through the coupling. This initial flow will be accompanied by a limited flow (of said substance) into the annular space 19 whereupon the substance will be quickly frozen and will effect the necessary seal.

When it is desired to separate the coupling parts, the cooling medium is discontinued and the electric heating coils 40 and 41 are energized. This will quickly heat the walls 13, 16 and thereby thaw and melt the frozen substance disposed between the said walls. The seal will thus be broken, and the coupling parts may now be separated.

It will be noted that, by the above construction, I have provided a novel and improved remotely operated coupling means for pipes, hoses and the like, which means is especially adapted to handle freezable liquid or flowable substances such as radioactive liquid metal. The coupling may be readily operated to assemble or disassemble it, is effective in providing a perfect seal, and is relatively simple and inexpensive to fabricate. No close or critical tolerances are required, and standard commercial dimensions may be utilized.

Variations and modifications may be made within the scope of the claims, and portions of the improvements may be used without others.

I claim:

1. Remotely operable means for coupling to each other the juxtaposed ends of a pair of rigid tubular fluid lines in which a freezable substance is to be carried, comprising cooperable telescoping, inner and outer mating rigid tubular parts connected to the ends of said fluid lines and heat-insulated from the lines so as to be in poor heat-conducting relation thereto, said inner tubular part being substantially U-shaped having inner and outer spaced walls, the entire outer surface of said outer spaced wall being disposed in closely spaced relation with the inner wall surface of said outer tubular part when the said inner tubular part is telescopically inserted into said outer tubular part, passage means between the inner end of said inner tubular part and the inner wall surface of said outer tubular part and through which the substance carried by said lines may flow into the space between the outer surface of said outer spaced wall and the inner wall surface of said outer tubular part, remotely controlled means including a pair of separate devices associated respectively with said parts in intimate heat-conducting relation thereto, for applying a cooling medium directly to the outer surface of said outer tubular part opposite said outer spaced wall and also to the inner surface of said outer spaced wall to lower the temperature thereof effectively and sufficiently to freeze any of said substance disposed between the inner surface of the outer tubular part and the outer surface of said outer spaced wall while permitting continuous flow of fluid through the said lines; and separate remotely controlled means for applying a heating medium to the outer surface of said outer tubular part opposite said outer spaced wall and also to the inner surface of said outer spaced wall to raise the temperature thereof and thereby melt the said substance between said outer tubular part and said outer spaced walls so that said tubular parts may be disassembled.

2. The invention as defined in claim 1, wherein the means for applying the cooling medium comprises a conduit formed with nozzles arranged to spray a cooling substance into the U-shaped space between the inner and outer spaced walls.

3. The invention as defined in claim 2, including heat insulation material surrounding said inner spaced wall.

4. The invention as defined in claim 1, including projections formed on the outer surface of said outer spaced wall and projections formed on the inner wall surface of said outer tubular part, said projections being of a length less than the width of the space between said outer surface of the outer spaced wall and the inner wall of the outer tubular part and being staggered with respect to one another.

5. The invention as defined in claim 4, wherein the projections are tapered to facilitate separation of the mating parts.

6. The invention as defined in claim 1, wherein stop means is provided to limit the extent to which the parts may be telescoped.

7. The invention as defined in claim 1, wherein the means for applying a heating medium comprises an electrical heating coil mounted on the outer surface of said outer tubular part.

8. The invention as defined in claim 1, wherein the means for applying a heating medium comprises an electrical heating coil mounted on the outer surface of said outer tubular part and a second electrical heating coil mounted on the inner surface of said outer spaced wall.

9. The invention as defined in claim 1, wherein the means for applying a cooling medium comprises a helical coil of tubing mounted on the outer surface of said outer tubular part in intimate heat-exchanging relation therewith.

10. The invention as defined in claim 1, wherein the means for applying a cooling medium comprises a helical coil of tubing mounted on the outer surface of said outer tubular part in intimate heat-exchanging relation therewith, and a second tubing arranged to apply a cooling medium to the inner surface of said outer spaced wall.

11. The invention as defined in claim 1, wherein the U-shaped inner tubular part is annular, and including an annular shield covering the opening of the inner tubular part.

12. The invention as defined in claim 1, wherein the means for applying the cooling medium comprises a tubular coil mounted on the outer surface of said outer tubular part, and the means for applying the heating medium comprises an electrical heating coil mounted in juxtaposed relation to said cooling coil, both in intimate heat-exchanging relation to said outer surface.

13. The invention as defined in claim 12, including a second electrical heating coil disposed in intimate heat-exchanging relation to the inner surface of said outer spaced walls.

References Cited in the file of this patent

UNITED STATES PATENTS

| | | |
|---|---|---|
| 995,537 | Hertner | June 20, 1911 |
| 1,184,066 | Bowie | May 23, 1916 |
| 1,369,919 | Eliel | Mar. 1, 1921 |
| 2,127,073 | Topping | Aug. 16, 1938 |
| 2,259,453 | Beyer | Oct. 21, 1941 |
| 2,663,580 | Shirk | Dec. 22, 1953 |
| 2,667,865 | Herman | Feb. 2, 1954 |
| 2,691,460 | Barnebey | Oct. 12, 1954 |
| 2,698,630 | McShurley | Jan. 4, 1955 |
| 2,739,829 | Pedlow | Mar. 27, 1956 |
| 2,780,482 | Brown | Feb. 5, 1957 |
| 2,799,522 | King | July 16, 1957 |

FOREIGN PATENTS

| | | |
|---|---|---|
| 26,644 | Great Britain | Dec. 16, 1898 |
| 2,826 | Austria | Nov. 26, 1900 |